(12) United States Patent
Giannini et al.

(10) Patent No.: US 9,996,873 B2
(45) Date of Patent: *Jun. 12, 2018

(54) METHODS, SYSTEMS AND DEVICES FOR RETAIL WEBSITE LINKING AND IMAGE MERGING

(75) Inventors: Robert Giannini, Jersey City, NJ (US); Robert J. Crawford, Apple Valley, MN (US)

(73) Assignee: TAMIRAS PER PTE. LTD., LLC, Dover, DE (US)

( * ) Notice: Subject to any disclaimer, the term of this patent is extended or adjusted under 35 U.S.C. 154(b) by 1898 days.

This patent is subject to a terminal disclaimer.

(21) Appl. No.: 12/567,453

(22) Filed: Sep. 25, 2009

(65) Prior Publication Data

US 2010/0023427 A1    Jan. 28, 2010

Related U.S. Application Data

(63) Continuation of application No. 09/531,102, filed on Mar. 17, 2000, now abandoned.
(Continued)

(51) Int. Cl.
*G06Q 30/00* (2012.01)
*G06Q 30/06* (2012.01)
(Continued)

(52) U.S. Cl.
CPC ... *G06Q 30/0643* (2013.01); *G06F 17/30893* (2013.01); *G06Q 30/0222* (2013.01); *G06Q 30/0229* (2013.01); *G06Q 30/0253* (2013.01); *G06Q 30/0254* (2013.01); *G06Q 30/0255* (2013.01); *G06Q 30/0256* (2013.01); *G06Q 30/0269* (2013.01); *G06Q 30/0273* (2013.01); *G06Q 30/0283* (2013.01); *G06Q 30/04* (2013.01); *G06Q 30/06* (2013.01); *G06Q 30/0601* (2013.01); *G06Q 30/0631* (2013.01);
(Continued)

(58) Field of Classification Search
CPC ........ G06Q 30/00; G06Q 30/02; G06Q 30/04; G06Q 30/06
USPC ............................................... 705/26.1, 27.1
See application file for complete search history.

(56) References Cited

U.S. PATENT DOCUMENTS 4,149,246 A    4/1979  Goldman
4,232,334 A    11/1980 Dyson
(Continued)

OTHER PUBLICATIONS www.amazon.com(not enclosed).
(Continued)

*Primary Examiner* — Hani M. Kazimi
(74) *Attorney, Agent, or Firm* — Brundidge & Stanger, P.C.

(57) ABSTRACT

An e-commerce method involves on-line viewing of a first article through a linking node for virtual merging on another structure. A particular application of the invention is directed to on-line apparel shopping involving a color matching scheme using color codes provided with images to be merged. For example, on-line viewing of one article, such as clothing, on another structure, includes creating an item from image-data corresponding to a colored article selected by an on-line viewer from an on-line viewer site with an image of a colored structure selected by the on-line viewer, and indicating whether the colored article and the colored structure satisfy a color-matching criterion.

8 Claims, 2 Drawing Sheets

Related U.S. Application Data

(60) Provisional application No. 60/167,493, filed on Nov. 24, 1999, provisional application No. 60/159,476, filed on Oct. 14, 1999.

(51) Int. Cl.
  *G06F 17/30* (2006.01)
  *G06Q 30/02* (2012.01)
  *G06Q 30/04* (2012.01)

(52) U.S. Cl.
  CPC ..... *G06Q 30/0633* (2013.01); *G06Q 30/0641* (2013.01)

(56) References Cited

U.S. PATENT DOCUMENTS

| | | | |
|---|---|---|---|
| 4,258,478 A | 3/1981 | Scott et al. | |
| 4,261,012 A | 4/1981 | Maloomian | |
| 4,297,724 A | 10/1981 | Masuda et al. | |
| 4,434,467 A | 2/1984 | Scott | |
| 4,514,178 A | 4/1985 | Noto et al. | |
| 4,539,585 A | 9/1985 | Spackova et al. | |
| 4,546,434 A | 10/1985 | Gioello | |
| 4,731,743 A | 3/1988 | Blancato | |
| 4,843,574 A | 6/1989 | Gerber | |
| 4,845,636 A | 7/1989 | Walker | |
| 4,854,880 A | 8/1989 | Nasby | |
| 4,872,056 A | 10/1989 | Hicks et al. | |
| 4,931,929 A | 6/1990 | Sherman | |
| 4,964,043 A | 10/1990 | Galvin | |
| 4,991,005 A | 2/1991 | Smith | |
| 4,992,050 A | 2/1991 | Edwards | |
| 5,012,413 A | 4/1991 | Sroka et al. | |
| 5,053,956 A | 10/1991 | Donald et al. | |
| 5,111,392 A | 5/1992 | Malin | |
| 5,117,354 A | 5/1992 | Long et al. | |
| 5,163,006 A | 11/1992 | Deziel | |
| 5,163,007 A | 11/1992 | Slilaty | |
| 5,195,043 A | 3/1993 | Vamer | |
| 5,206,804 A | 4/1993 | Thies et al. | |
| 5,244,131 A | 9/1993 | Hollingsworth | |
| 5,339,252 A | 8/1994 | White et al. | |
| 5,440,479 A | 8/1995 | Hutton | |
| 5,495,568 A | 2/1996 | Beavin | |
| RE35,184 E | 3/1996 | Walker | |
| 5,504,845 A | 4/1996 | Vecchione | |
| 5,515,268 A | 5/1996 | Yoda | |
| 5,530,652 A | 6/1996 | Croyle | |
| 5,537,211 A | 7/1996 | Dial | |
| 5,550,746 A | 8/1996 | Jacobs | |
| 5,551,021 A * | 8/1996 | Harada et al. | 382/305 |
| 5,555,496 A | 9/1996 | Tackbary et al. | |
| 5,559,714 A | 9/1996 | Banks et al. | |
| 5,593,072 A | 1/1997 | Hester et al. | |
| 5,608,852 A | 3/1997 | Hashimoto et al. | |
| 5,611,730 A | 3/1997 | Weiss | |
| 5,680,314 A | 10/1997 | Patterson et al. | |
| 5,684,963 A | 11/1997 | Clement | |
| 5,694,549 A * | 12/1997 | Carlin et al. | 709/250 |
| 5,694,551 A | 12/1997 | Doyle et al. | |
| 5,724,522 A | 3/1998 | Kagami et al. | |
| 5,729,699 A | 3/1998 | Hashimoto et al. | |
| 5,737,729 A | 4/1998 | Denman | |
| 5,742,931 A | 4/1998 | Spiegelhoff | |
| 5,743,407 A | 4/1998 | Williams | |
| 5,745,681 A | 4/1998 | Levine et al. | |
| 5,754,850 A | 5/1998 | Janssen | |
| 5,781,714 A | 7/1998 | Collins et al. | |
| 5,806,046 A | 9/1998 | Curran et al. | |
| 5,822,216 A | 10/1998 | Satchell, Jr. et al. | |
| 5,822,739 A | 10/1998 | Kara | |
| 5,845,263 A | 12/1998 | Camaisa et al. | |
| 5,850,222 A | 12/1998 | Cone | |
| 5,852,809 A | 12/1998 | Abel et al. | |
| 5,854,850 A | 12/1998 | Linford et al. | |
| 5,864,851 A | 1/1999 | Breitbart et al. | |
| 5,870,140 A | 2/1999 | Gillberry | |
| 5,870,718 A | 2/1999 | Spector | |
| 5,870,771 A | 2/1999 | Oberg | |
| 5,875,108 A | 2/1999 | Hoffberg et al. | |
| 5,880,974 A | 3/1999 | Tarumi et al. | |
| 5,884,029 A | 3/1999 | Brush, II et al. | |
| 5,892,946 A | 4/1999 | Woster et al. | |
| 5,895,454 A | 4/1999 | Harrington | |
| 5,905,973 A | 5/1999 | Yonezawa et al. | |
| 5,907,617 A | 5/1999 | Ronning | |
| 5,923,324 A | 7/1999 | Berry et al. | |
| 5,930,769 A * | 7/1999 | Rose | 705/26.81 |
| 5,946,665 A * | 8/1999 | Suzuki et al. | 705/26.62 |
| 5,950,165 A | 9/1999 | Shaffer et al. | |
| 5,950,173 A | 9/1999 | Perkowski | |
| 5,970,471 A | 10/1999 | Hill | |
| 5,974,400 A | 10/1999 | Kagami et al. | |
| 5,983,200 A | 11/1999 | Slotznick | |
| 5,983,201 A | 11/1999 | Fay | |
| 5,983,267 A | 11/1999 | Shklar et al. | |
| 5,995,943 A | 11/1999 | Bull et al. | |
| 6,002,855 A | 12/1999 | Ladner et al. | |
| 6,009,413 A | 12/1999 | Webber et al. | |
| 6,014,638 A | 1/2000 | Burge et al. | |
| 6,016,504 A * | 1/2000 | Arnold et al. | 709/200 |
| 6,017,157 A | 1/2000 | Garfinicle et al. | |
| 6,026,368 A | 2/2000 | Brown et al. | |
| 6,026,376 A | 2/2000 | Kenney | |
| 6,026,377 A | 2/2000 | Burke | |
| 6,029,142 A | 2/2000 | Hill | |
| 6,037,936 A | 3/2000 | Ellenby et al. | |
| 6,089,424 A | 7/2000 | Colquhoun | |
| 6,130,627 A | 10/2000 | Tyburski et al. | |
| 6,144,388 A | 11/2000 | Bornstein | |
| 6,293,284 B1 | 9/2001 | Rigg | |
| 6,301,044 B1 | 10/2001 | Huber et al. | |
| 6,307,568 B1 * | 10/2001 | Rom | 345/629 |
| 6,323,969 B1 | 11/2001 | Shimizu et al. | |
| 6,343,275 B1 * | 1/2002 | Wong | 705/26.1 |
| 6,490,602 B1 * | 12/2002 | Kraemer | 715/236 |
| 6,553,389 B1 * | 4/2003 | Golding et al. | |
| 6,665,577 B2 | 12/2003 | Onyshkevych et al. | |
| 6,903,756 B1 | 6/2005 | Giannini | |
| 7,328,177 B1 * | 2/2008 | Lin-Hendel | 705/26.7 |
| 7,663,648 B1 * | 2/2010 | Saldanha et al. | 345/630 |
| 2001/0034644 A1 * | 10/2001 | Anavi et al. | 705/14 |
| 2001/0051903 A1 * | 12/2001 | Hansmann et al. | 705/26 |
| 2002/0024528 A1 | 2/2002 | Lambertsen | |
| 2002/0169661 A1 * | 11/2002 | Demsky et al. | 705/14 |
| 2003/0033222 A1 * | 2/2003 | Fuwa et al. | 705/27 |
| 2003/0144915 A1 * | 7/2003 | Aupperle et al. | 705/26 |
| 2004/0078276 A1 * | 4/2004 | Shimogori | 705/26 |

OTHER PUBLICATIONS http://jsharones.com/prod013234.h(not enclosed).
http://www.cspring.com/aero_lettering/c_match.htm(not enclosed).
www.virtualmakeover.com.
www.sesoft.com/customer/index.html.
"The World's First Whole Body Scanners Bring True Human Forms to Computer Graphics," http://www.cyberware.com/pressReleases/first WB.html (May 11, 1995), 1 page.
"ModaCAD Latest to Seek 'Net Gain on Apparel," http:/www.apparelnews.net/Archive/082898/fashion/fashfeat.html (Aug. 28, 1998), 3 pages.
"Wicks and Wilson TriForm® BodyScan booth-first time in USA," www.wwl.co.uk.
"Wicks and Wilson announces its first Body Scanning booth," www.wwl.co.uk.
"Wicks and Wilson TriForms® 3D system helps to take goalkeeping into the space age," www.wwl.co.uk.
"Modacad, Inc. Launches Women's E-commerce 'Style' Shopping Site," http//www.urlwire.com/newsarchive/050399a.html (May 3, 1999), 2 pages.
"Populating the Web: Pioneering a paradigm for photo realistic Avatars," http//www.avatarme.com/concept/concept.htm (Aug. 1999), 5 pages.

(56) References Cited

OTHER PUBLICATIONS

"PhotoModeler High Quality Photo-Textured Objects," http://www.eossystems.com/phototex.htm (copyright 1995-1999), 10 pages.

*Land's End Direct Merchants* Catalogue (Sep. 1999), p. 101. www.landsend.com.

"Macys.Com To Sell Borderbund Makeover Software," http//dailynews.yayoo.com/h/nm/19990903/tc/macyscom_2.html (Sep. 3, 1999), 2 pages/.

"If the Jeans Fit . . . page 3: Three Hours Later," http//www.upside.com (Sep. 3, 1999), 1 page.

"When Off-The Rack Becomes Off-The-Net," *Scientific American Presents your Bionic Future* (Nov. 1999), 5 pages.

"Macy's Eases Swimsuit Fear with Database," http://www.wired.com/news/news/story/3226.html (Apr. 17, 1997), 2pages.

"Fashion Studio," http://www.dynagraphicsinc.com/main.htm (Sep. 14, 1999), 4 pages.

"What is the Dressing Sim?," http://www.toyobo.co.jp/e/mirai/dr...gsim/TopPage/aboutDressingSim.html (Sep. 14, 1999), 5 pages.

Nebojsa Jojic, http://ww.ifp. uiuc.edu/'jojic/ (Sep. 14, 1999), 5 pages.

A Framework for Garment Shopping over the Internet, Jojic et al., *Handbook of Electronic Commerce* (May 1999), 22 pages.

Media Motion Publications, Flash 'N Fashion (Copyright1995-1997), 3 pages. www.media-motion.com/.

Meta Creations Poser 4, (Sep. 14, 1999), 3 pages. www.metacreations.com.

"Finding a Look," *New York Times* (Oct. 14, 1999), 1 page.

"3D Metrics-Capturing the Dimension of Life," http://www.3dmetrics.com (copyright1999), 1 page.

"Welcome to Click Dress," http://www.hi-pic.co.il/ (Dec. 7, 1999), 1 page.

"Killer Loop Virtual Preview," http://www.killerloopeyewear.com/html/kivp.html (Dec. 2, 1999), 1 page.

www.peepsun.com.

http://marketwiz.net.

www.pearlevision.com.

www.beyond.com.

http.//orders.xoom.com.

www.itreviews.com.

"Welcome to Ray Ban Virtual Preview," http://www.rayban.com/htm/rbvp.html (Dec. 2, 1999), 2 pages.

QuickyMart TM Cuts Cost, Eases Set-Up of 'Me-Commerce' Sites: PR Newswire (Jul. 28, 1999).

"Herman Miller's New online 'Room Planner' Makes Designing from Home Fun and Easy" PR Newswire (Mar. 18, 1999).

\* cited by examiner

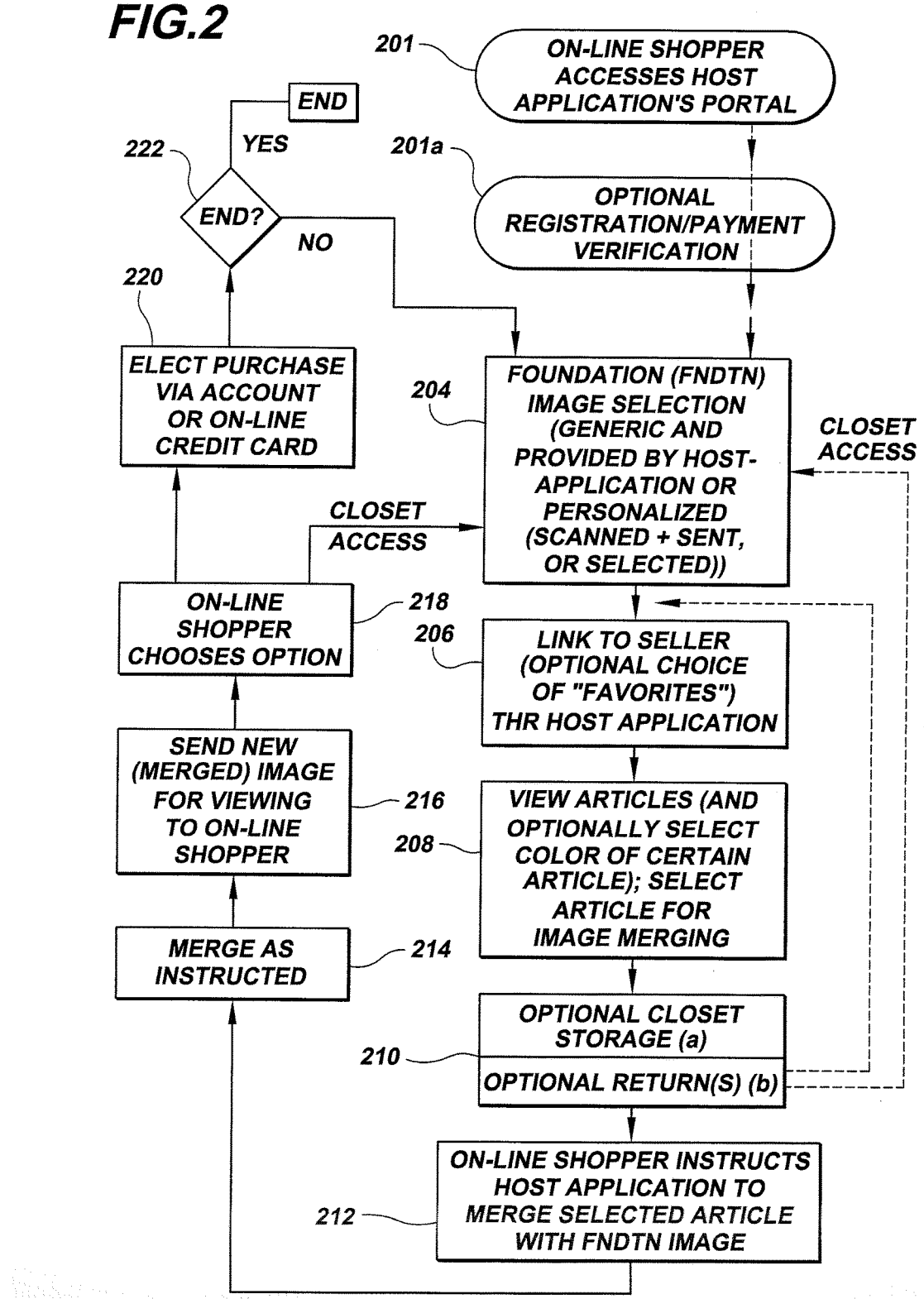

METHODS, SYSTEMS AND DEVICES FOR RETAIL WEBSITE LINKING AND IMAGE MERGING

RELATED PATENTS DOCUMENTS

This patent document is a continuation under 35 U.S.C. § 120 of U.S. patent application Ser. No. 09/531,102 filed on Mar. 17, 2000, which claims benefit of U.S. Provisional Patent Application Ser. No. 60/167,493 filed Nov. 24, 1999, and of U.S. Provisional Patent Application Ser. No. 60/159,476 filed Oct. 14, 1999, which are incorporated herein by reference.

FIELD OF THE INVENTION

The present invention relates generally to e-commerce and, more specifically, to use of linked web servers sites for on-line shopping.

BACKGROUND

The consumer in today's market is limited to a particular retailer's or department store's inventory, selection and styles. Traditionally, a consumer shops for items from different stores with the anticipation and hope that the items will coordinate. Alternatively, a consumer will wait for an opportunity to try on all the different items purchased and return those items that do not coordinate. Recent technological advances have attempted to enhance the shopping ability through the use of e-commerce, sometimes referred to as "online buying" or "online shopping."

There are differences inherent between "online buying" and "online shopping" in that current e-commerce transactions are based on the individual buying goods or services online that they have either decided to buy prior to logging on to the internet or find as a result of bargain hunting on the internet. There is very little, if any, true shopping on the internet. Most women define shopping as an "experience" "fun" "exciting" and the like. True shopping is going to a mall or department store with the intention of buying yet to be determined goods or services. Few consumers are getting on the internet with the same mindset that they have before they physically go shopping. It is the difference between logging onto the internet to buy an additional pair of Levi's Jeans and going shopping and then coming home with 2 pairs of Levi's Jeans, a belt, 2 sweaters and 2 shirts.

A particular problem that arises in connection with shopping electronically concerns color matching. Unlike true shopping where the buying experience involves the ability of the user to color-match articles based on actual appearances, the colors of the articles are mischaracterized when displayed for the shopper over a computer terminal. This alteration is largely due to miscalibrations at both the input (e.g., image capturing) and the output, for example, the display terminal itself. Consequently, few consumers are comfortable color matching items over the internet.

SUMMARY

One aspect of the present invention is generally directed to a method for on-line viewing of articles that are color matched using a color-identification standard. An example implementation of this aspect of the present invention involves on-line viewing of a first article through a linking node for virtual merging on another structure. A color matching scheme uses color codes provided with the images to be merged. In a more particular example, on-line viewing of one article, such as clothing, on another structure, includes creating an item from image-data corresponding to a colored article selected by an on-line viewer from an on-line viewer site with an image of a colored structure selected by the on-line viewer, and indicating whether the colored article and the colored structure satisfy a color-matching criterion.

Another particular application of the present invention involves an on-line viewer linked to the host-site and to a virtual closet maintained by the host-site. The host-site selects a structure in response to a command received by the on-line viewer, and using the host-site, the viewer is linked to the article-provider site and images are passed from that site for view by the on-line viewer. A selected one of the articles is merged with the structure by forming an image including representations of both the structure and the selected article.

An optional feature allows each user a certain amount of storage capacity, referred to as a "closet," where the user can store different items from multiple stores as they move from store to store, each time bringing back different items to mix and match, coordinate and so on. This storage space allows the consumer to put items "on hold" for a limited period of time without purchasing them. Color codes are included with each article stored in the closet. This feature allows consumers to return at a later date and purchase these items with a full appreciation of their color coordination.

The above summary of the present invention is not intended to describe each illustrated embodiment or every implementation of the present invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2 is a flowchart of an example manner for implementing one aspect of the present invention.

Figure 1:
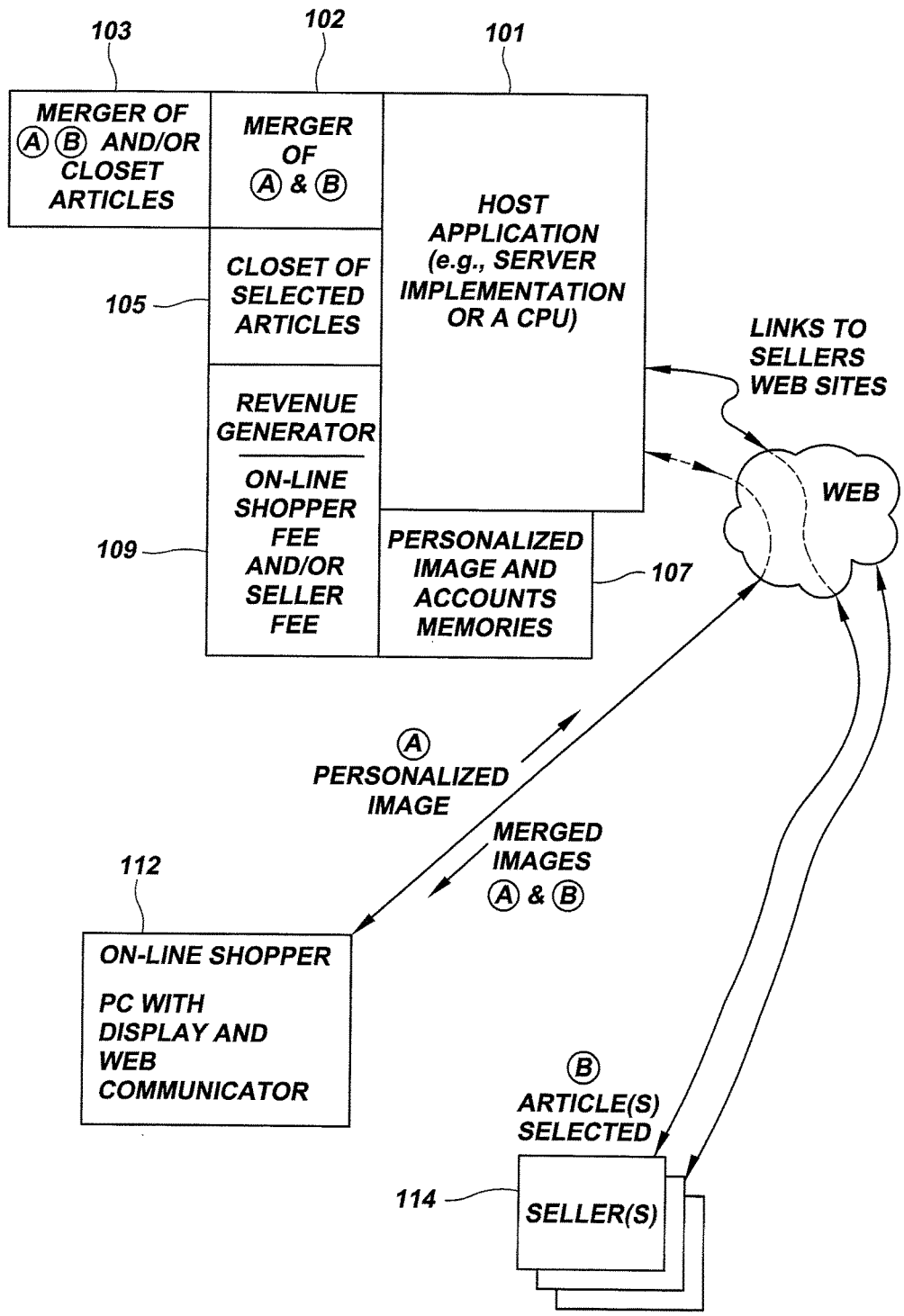
FIG. 1 illustrates a block diagram of a system for implementing the present system in accordance with one example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to a method and system involving e-commerce over interconnected communication networks such as those currently known as the Internet. The present invention is particularly suited for conveniently bringing virtual apparel into customers' respective homes and permitting customers to try on the apparel before accepting/purchasing the apparel. While the present invention is not necessarily so limited, a better understanding of the invention will be found by reading the detailed description and exemplary embodiments that follow.

FIG. 1 illustrates an example embodiment of a method and system for implementing the present system. The system includes a host application server 101 including several example functional blocks. These blocks include a block 102 that merges two images A and B (e.g. corresponding to a personalized or generic article identified by the on-line shopper, and a foundation or structure image to be merged with the identified article). Another block 103 permits merging of images selected from A, B, and/or articles previously stored in a "closet," depicted as block 105. Another block 107 includes personalized images and an inventory of generic images corresponding to the foundation or structure. A revenue generator block 109 provides fee generation from on-line shoppers who subscribe to the host application server per on-line or off-line agreement, and/or fee generation from retailers (or sellers) and others such as magazine publishers desiring participation and benefit from the system of FIG. 1.

The on-line shopper uses a PC or intelligent black box 112 to access the host application server 101. Through this access, the on-line shopper either selects a generic structure from an inquiry of such structures provided by block 107 or provides a personalized image (for example, a scanned image of himself or of his house) to be used as the structure. Using the host application server 101, the on-line shopper is coupled through the web to a seller, depicted at block 114. Images of selectable articles are communicated back to the on-line shopper over the web and through the host application server 101. The on-line shopper selects one or more articles from at least one of the sellers for storage in the closet 105, and/or for merging with the previously-selected structure. Similarly, the structure can be changed per a command from the on-line shopper so as to merge the selected article(s) with different structures. In response, the host application server 101 processes images corresponding to the article and structure and generates a new image including representations of both the structure and the article.

FIG. 2 is a flow chart of an example process for implementing the example system of FIG. 1, according to the present invention. As discussed above, after accessing the host application server 201, optionally the host application server verifies registration/payment as is conventional with current on-line shopping as depicted at 201a. At block 204 the structure or foundation is selected as discussed above, and at block 206 the link is made to the seller. At block 208 the article(s) is viewed by the on-line shopper and, optionally, a selection of a color and/or size for the article is made. Next, the on-line shopper selects the article as a candidate for storage in the closet and/or for merging with the structure.

At block 210 the on-line shopper instructs the host application server to store the article in the closet by returning to block 204, merge with the structure as depicted at block 212, or return to block 206 for linking to the same seller or another seller for additional viewing.

From block 212 flow proceeds to block 214 where the new image is created per the merger instruction.

Next, at block 216, the new image is sent for viewing to the on-line shopper.

At block 218 the on-line shopper chooses one of multiple options. Either the closet is accessed and the on-line shopper returns to block 204, or an election is made to purchase the article and/or other articles that may have been stored in the closet as depicted in block 220. From block 220, flow proceeds to block 222 where the on-line shopper decides to return to block 204 or end the transaction.

Example articles can be: A) clothing; B) paint; C) furniture; D) glassware; E) landscaping; F) orthodontic and teeth ware; G) cabinetry; H) plastic-surgery type enhancements; I) car/person.

Example foundation for merger with corresponding article(s) can be: a) person, pet; b) house, cars, etc.; c) house, cars, office, etc.; d) kitchen, face; e) yard; f) mouth; g) rooms in office/house; h) person (chest, face, belly, etc.); I) person/car.

In another example embodiment according to the present invention, an important advantage relating to color matching is achieved using a commonly-used color standard that covers sufficient color variations to permit various articles to be matched to one another. In one more specific embodiment, an industry color-standardization scheme is used. Examples include: Exxel Color Match Guide (see http://sharones.com/prod013234.htm) and Color match Chart (http://www.csprings.com/aero_lettering/c_match.htm). More sophisticated color standardization schemes include the above examples in combination with equipment specifically identifying a frequency range corresponding to the color of the article in question or the equipment approach by itself.

Example equipment of this type includes optics-based detectors adapted to provide a measured (color) frequency in a given light condition/environment. For example, white light may be used along with selected background materials characterized within certain selected ranges of reflectivity. Other definitional parameters needed and/or useful in connection therewith will be apparent to those skilled in the art.

In a particular application, the color frequencies measured for the articles to be matched are reported and provided in the form of a tag that is carried with the article, electronically for the web server shopping function and, optionally, as a supplemental hard-copy coded label (e.g., as part of or as a supplementation to the coding used on a bar code label). In a more particular implementation involving this use as part of the bar code label, the conventional bar code scanners and bar code generators are modified and adapted to receive the color frequency of the article and to conveniently report the color frequency in conjunction with the electronic shopping function and/or the conventional/reality shopping applications.

In yet another more specific embodiment, the closet of selected articles (as described for example in connection with block 105 of FIG. 1) is electronically defined using a partial-data set corresponding to each of the closeted articles. In one application thereof, the partial-data set comprises an outline definition of each of the articles along with the color frequency codes linked to the various sections of each article, as necessary to fully define the article in terms of article shape and color. Further, the size of the article is also stored as part of the partial-data set. Collectively, these various pieces advantageously define all needed aspects of each article in the closet without having to consume excessive amounts of memory and without requiring excessive processing to recreate the article for view by the user.

The virtual closet discussed above in connection with FIG. 1 can be used to permit the shopper to buy or hold (without buying) an article and subsequently retrieving the article for matching to other articles in terms of structure, size, color and other stylistic aspects. In applications concerned with limited memory bandwidth, the host application can provide a maximum amount of storage space for each shopper, with additional storage space being provided for a fee. These data stored in such memory is limited to a fixed-period, e.g., one month, with extensions being provided for yet additional consideration, such as a monthly fee or purchases of items stored in the closet during an immediately preceding period. This approach advantageously encourages the shoppers to revisit the host application repeatedly to access their personalized virtual closet, and advantageously provides on-going advertising for (which is also optionally billed on a related, on-going basis to) the seller/retailers.

According to another aspect of the present invention, on-line shoppers (for example 112 of FIG. 1) are provided a number of selectable icons or other data permitting feedback from the host/server (for example 101 of FIG. 1). Examples include: expert fashion advice (e.g., professional consultants employed by the retailers (for example sellers 114 of FIG. 1), outside fashion consultants and/or employees of the entity providing the host application (101 of FIG. 1); on-line offers from the sellers (discounts, sales, etc.); updates on up-coming styles, colors, the most recent and hottest fashions. Each of these various offerings is optionally categorized for convenient selection by the shopper/user, for example, by category, style, activities, retailers. Advantageously, this application permits the host application to provide the sellers unique demographic information pertaining to particular customers' interests, selection trends and other data useful in attracting the shoppers to the retailers.

For convenience to the shoppers, a feedback icon can be used to provide a "favorite retailers" list to be defined by each shopper. When the shopper logs onto the host application, any of these favorite retailers can be immediately linked to for various uses. Examples include: reviewing closeted items and making changes thereto for a particular retailer, checking sales at that particular retailer and/or continuing to shop at a particular retailer without being required to return to the host application web site. Further, as a shopper links from retailer to retailer (the "Favorites"), a "shopping basket" can be selected and filled as the shopper accesses the articles According to another important aspect of the present invention, the host application includes a search engine that searches selected, or all, participating sellers/retailers for particular merchandise, as identified by the on-line shopper. In one implementation, this service is provided to the shopper using a selectable icon or other feedback data as discussed above. At this point, the host application can: list all such retailers and allow the shopper to link to their web site; virtually pull the item from the respective web sites and allow the shopper to "try on" the article or store it in the closet (with a variation which optionally permits the shopper to change the size and color); and/or a combination of these approaches.

Implementation of the merging function can be accomplished using one or more of a variety of currently-available methods. Examples of such methods include those used in connection with web sites: www.virtualmakeover.com and www.segasoft.com/customer/index.html. Other example implementations are described and illustrated in U.S. Pat. No. 5,930,769 entitled, "System and Method for Fashion Shopping." Various types of software and hardware can be used to implement each aspect of the system and method described.

As noted above, the present invention is applicable to a number of techniques for merging various types of structures, or foundations, with one or more corresponding articles. The present invention should not be considered limited to the particular examples described above, but rather should be understood to cover all aspects of the invention as fairly set out in the attached claims. For example, the present invention could be characterized as covering one or more of the above characterized features. Accordingly, various modifications, equivalent processes, as well as numerous structures to which the present invention may be applicable will be readily apparent to the skilled artisan upon review of the present specification.

What is claimed is:

1. A computer-operated method implemented by a programmable server that executes instructions to cause the programmable server to perform operations, comprising:
   processing software instructions to implement steps of
      providing a host application website that displays viewable articles offered by a plurality of sellers;
   linking, in response to an input received from an on-line shopper, to a first seller website;
   while linked to the first seller website, allowing for one or more articles to be selected;
   linking, in response to an input selection received from the on-line shopper while the on-line shopper is linked to the first seller website, to a second seller website;
   while linked to the second seller website, allowing for one or more articles to be selected;
   returning, in response to an input received from the on-line shopper, to the host application website;
   in response to the selection of articles,
      accessing article image data for at least one of the selected articles;
      accessing structure image data for a structure; and
      merging the structure image data and the article image data to generate a merged image data for displaying the at least one of the selected articles and the structure;
   outputting the merged image for the on-line shopper; and
   storing the article image data for the at least one of the selected articles in a virtual closet for access by the on-line shopper and allocating a limited amount of storage in the virtual closet for the on-line shopper.

2. The method of claim 1, wherein the operation of processing software instructions is further implemented to perform the operations of:
   retrieving a list of favorite sellers for the on-line shopper;
   providing icons for the on-line shopper to select one or more of the favorite sellers; and
   allowing the on-line shopper to link between seller websites of the favorite sellers without returning to the host application website.

3. The method of claim 1, wherein the operation of processing software instructions is further implemented to perform the operations of:
   providing the on-line shopper with one or more icons that identify the at least one of the selected articles in the virtual closet;
   retrieving the stored article image data for at least one of the selected articles in the virtual closet in response to the on-line shopper selecting at least one of the icons; and
   providing the retrieved article image data to the on-line shopper.

4. The method of claim 3, wherein the operation of processing software instructions is further implemented to perform the operations of:
   providing the on-line shopper with options for changing the appearance of the article image data for at the least one of the selected articles;

modifying the article image data in response to input received from the on-line shopper indicating a change in the appearance of the article image data; and providing the modified article image data to the on-line shopper.

5. The method of claim 1, wherein the operation of processing software instructions is further implemented to perform the operations of:

categorizing the selected articles according to groups defined at least one of style, activities and sellers; and providing the categorized articles to the on-line shopper configured in a viewable format that differentiates the defined groups.

6. The method of claim 2, wherein the operation of processing software instructions is further implemented to perform the operation of generating fees for sellers based upon an amount of storage of article image data for articles offered by the sellers.

7. The method of claim 1, wherein the operation of processing software instructions is further implemented to perform the operation of uploading, from the on-line shopper, image data for the structure.

8. The method of claim 1, wherein the method further includes operations of:

accessing another article image data for another one of the selected articles, and merging the accessed image data for both of the articles with the structure, wherein the accessed image data includes data for an article from the first seller website and data for an article from the second seller website.

* * * * *